United States Patent [19]

Matsuura

[11] Patent Number: 4,870,337
[45] Date of Patent: Sep. 26, 1989

[54] PICK-FEED METHOD IN TRACING OF A ROTATING BODY

[75] Inventor: Hitoshi Matsuura, Tokyo, Japan

[73] Assignee: Fanuc Ltd., Minamitsuru, Japan

[21] Appl. No.: 269,747

[22] PCT Filed: Feb. 29, 1988

[86] PCT No.: PCT/JP88/00218
§ 371 Date: Oct. 28, 1988
§ 102(e) Date: Oct. 28, 1988

[87] PCT Pub. No.: WO88/09506
PCT Pub. Date: Sep. 7, 1988

[30] Foreign Application Priority Data

Mar. 3, 1987 [JP] Japan .................................. 62-048311

[51] Int. Cl.⁴ .......................................... G05B 19/36
[52] U.S. Cl. ................... 318/578; 364/474.03; 409/99
[58] Field of Search ................... 318/578, 576, 574; 364/474.03, 474.29; 409/99, 84

[56] References Cited

U.S. PATENT DOCUMENTS

4,620,142 10/1986 Yamazaki et al. .................. 318/578
4,688,179  8/1987 Yamazaki ....................... 364/474.03
4,719,578  1/1988 Okitomo ......................... 364/474.03
4,746,251  5/1988 Yoshikawa et al. .................. 409/84
4,747,734  5/1988 Ide et al. ............................. 409/99

Primary Examiner—Benjamin Dobeck
Attorney, Agent, or Firm—Staas & Halsey

[57] ABSTRACT

The invention relates to a pick-feed method in rotating body tracing for performing tracer control by rotating a model (MDL), advancing or retracting a stylus (ST) in contact with the model, in dependence upon the shape of the model, in a direction of the center of rotation ($O_M$), and pick-feeding the stylus in a plane parallel to a rotational axis of the model every revolution of the model. This pick-feed method includes forming first and second areas (AI, AII) by dividing the full circumference of the model in half by a straight line (LL') connecting a point ($P_L$) having a predetermined rotational angle ($\theta_L$) and the center of rotation ($O_M$) of the model, determining in which area the stylus (ST) is present when the stylus is rotated relative to the the model (MDL) by rotating body tracer control, refraining from executing a pick-feed when the stylus enters the second area (AII) from the first area (AI), and executing a pick-feed when the stylus enters the first area from the second area.

5 Claims, 5 Drawing Sheets

PICK-FEED METHOD IN TRACING OF A ROTATING BODY

DESCRIPTION

1. Technical Field

This invention relates to a pick-feed method in the tracing of a rotating body. More particularly, the invention relates to a pick-feed method in which a pick-feed can be executed accurately every revolution with just one limit line in the direction of rotation.

2. Background Art

Figure 6:
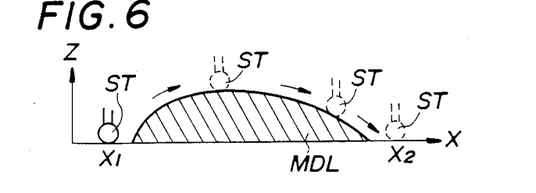
FIGS. 6 through 9 are views for describing the background of the invention.

In tracer control, as shown in FIG. 6, a surface tracing method entails moving a stylus ST over a range $X_1 \sim X_2$, which is a tracing area, along the X axis or feed axis, moving the stylus up and down along the X axis or tracing axis in dependence upon the shape of a model MDL, thereby in effect causing the stylus to trace the model MDL so that a workpiece may be subjected to machining conforming to the shape of the model by means of a cutter, not shown.

In this surface tracing method, only the model profile above the feed axis (X axis) is traced, so that it is impossible to trace a model having an overhanging profile.

Figure 7:
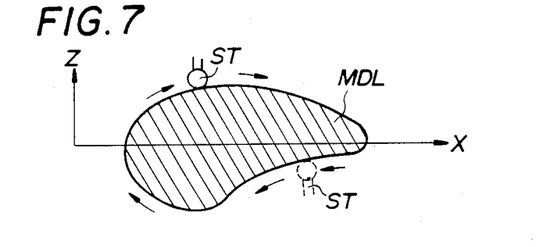

In a case where a cam or the head of a golf club is to be profiled, however, it is necessary to profile not just the surface on one side but both the front and back surfaces. When it is attempted to apply the above-described surface tracing method to tracing of both front and back surfaces, the stylus ST must be rotated by 180° to shift it from front surface tracing to back surface tracing (see the dotted line in Fig. 7). However, the arrangement for performing tracing upon rotating the stylus by 180° is complicated and undesirable for this reason.

A rotating body tracing method which does not require that the stylus be rotated has been proposed and put into use. According to this rotating body tracing method, tracer control is carried out by rotating the model MDL about a predetermined rotational axis, as shown in FIGS. 8(a), (b), and moving the stylus ST in contact with the model up and down in dependence upon model shape in the direction (Z-axis direction) of a line connecting the center $O_S$ of the stylus and the rotational center $O_M$ of the model.

Figures 8A, 8B:
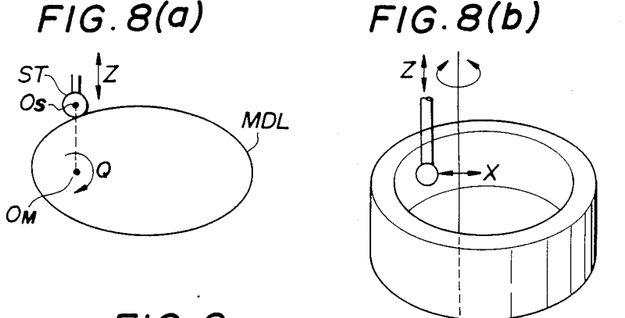

The case shown in FIG. 8(a) represents a method of tracing the surface of the rotating body, and FIG. 8(b) shows a method of tracing the profile of the rotating body.

The case of FIG. 8(a) in which the surface of the rotating body is profiled will be described hereinbelow. However, the method will be similar for the case of FIG. 8(b) where the profile is profiled.

Figure 9:
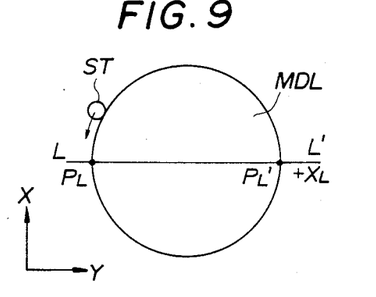

In this tracing of a rotating body, it is required that the stylus ST be pick-fed a predetermined amount each time in a direction orthogonal to the page each time the model MDL makes one revolution. In well-known 360°-contouring tracing of a profile, if one limit line LL' (where $+X_L$ represents the X-axis coordinate) is set up, as shown in FIG. 9, then one revolution of tracing is realized, with application of pick-feed in the direction orthogonal to the page, by the stylus' crossing the limit line, namely $X_L$, twice, wherein the present position of the stylus ST is monitored. The reason why a pick-feed can be performed every single revolution with just one limit line is that two points (PL, PL') having the same X-axis coordinate exist while the stylus is making one revolution.

In the tracing of a rotating body, however, the coordinate in the direction of rotation (the circumferential direction) is expressed by an angle and there is only one point having the same rotational angle in one revolution. Moreover, when the coordinate in the direction of rotation attains a value of 360° starting from 0°, the coordinate returns to 0° and then repeats the cycle of 0° to 360° in cyclic fashion.

In conventional rotating body tracing, therefore, control for effecting a pick-feed every revolution is difficult merely by setting one limit line (the rotational coordinate of which is $\theta_L$) and comparing the present position $\theta$ and $\theta_L$.

Accordingly, an object of the invention is to provide a pick-feed method in rotating body tracing in which a pick-feed can be made reliably every revolution with just one limit line.

DISCLOSURE OF THE INVENTION

The invention relates to a pick-feed method in rotating body tracing for performing tracer control by rotating a model, advancing or retracting a stylus in contact with the model, in dependence upon the shape of the model, in a direction of the center of rotation, and pick-feeding the stylus in a plane parallel to a rotational axis of the model every revolution of the model. This pick-feed method includes forming first and second areas by dividing the full circumference of the model in half by a straight line connecting a point having a predetermined rotational angle and the center of rotation of the model, determining in which area the stylus is present when the stylus is rotated relative to the model by rotating body tracer control, refraining from executing a pick-feed when the stylus enters the second area from the first area, and executing a pick-feed when the stylus enters the first area from the second area.

BEST MODE FOR CARRYING OUT THE INVENTION

Figure 1:
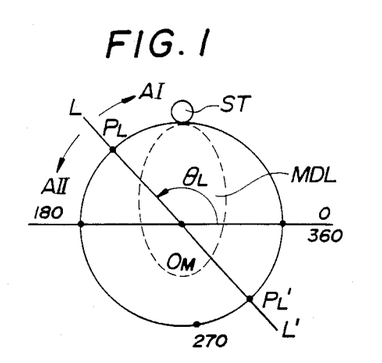
FIG. 1 is a view for describing the general features of the invention.

FIG. 1 is a view for describing the general features of the invention.

ST represents a stylus, MDL (the dashed line) a model, $O_M$ the rotational center of the model, LL' a limit line, and $P_L$ a point, which is on the periphery of a circle, specifying the limit line. AI and AII respectively represent first and second areas obtained when the full circumference of the model is divided in half by the limit line.

Thus, it is assumed that there are two areas AI, AII obtained when the full circumference of the model is divided in half by the limit line LL' specified by a predetermined rotational angle $\theta_L$ (the limit line being a straight line connecting the point $P_L$ of $\theta_L$ and the rotational center $O_M$ of the model MDL). At the start of tracing of the rotating body, it is determined in which area the stylus ST is present. Assume that the stylus is initially located in the first area AI. When the stylus ST is rotated relative to the model MDI due to tracing of the rotating body, it is determined in which area the stylus ST is present. Pick-feed is not performed when the stylus penetrates the second area AII from the first area AI, but pick-feed is performed when the stylus penetrates the first area AI from the second area AII.

Figure 2:
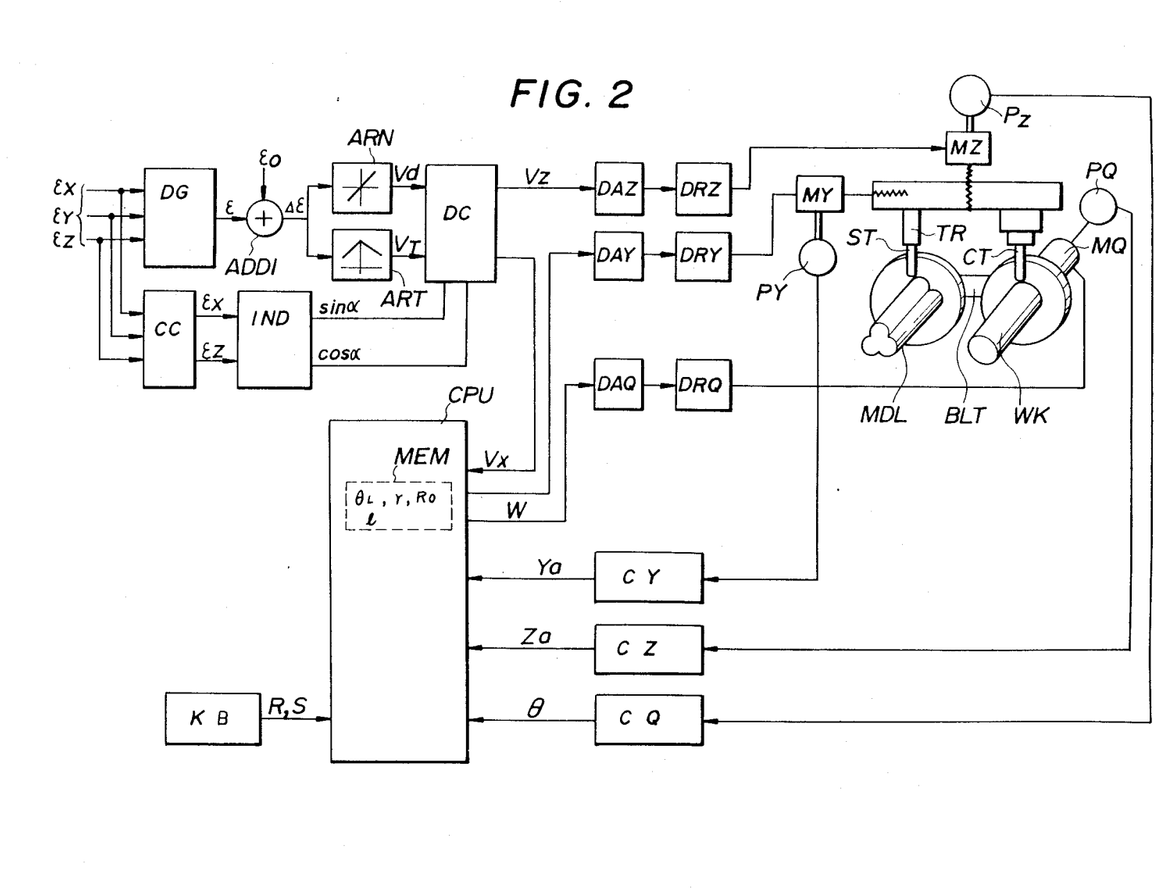
FIG. 2 is a block diagram of an apparatus for practicing the present invention.
Figure 3:
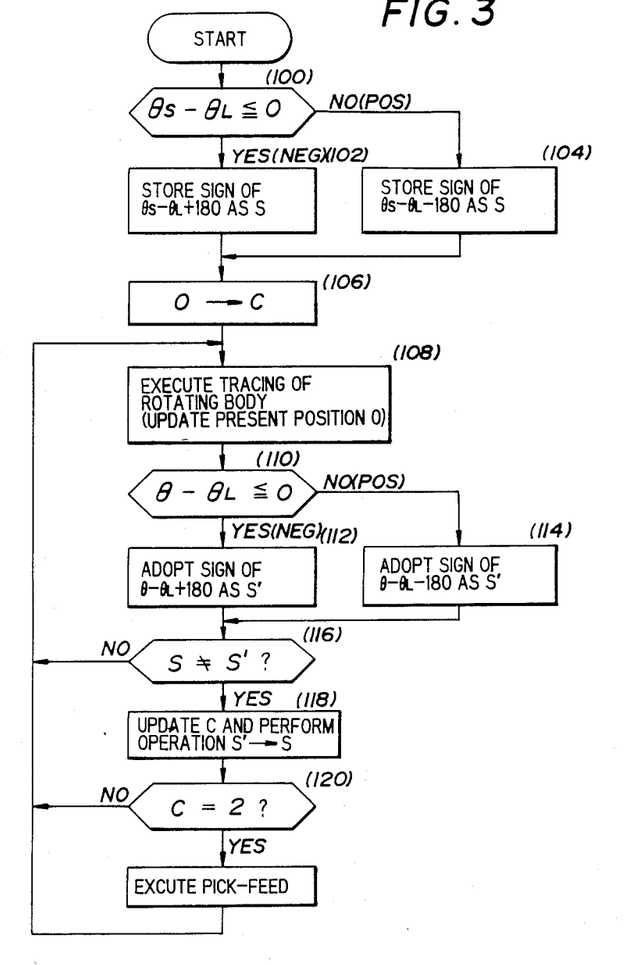
FIG. 3 is a flowchart of processing according to the invention.

FIG. 2 is a block diagram of an apparatus for practicing the present invention, FIG. 3 is a flowchart of processing according to the invention, and FIGS. 4 and 5 are views for describing processing according to the invention.

In FIG. 2, DG represents a displacement synthesizing circuit, CC a changeover circuit, IND an indexing circuit, ARN, ART velocity computing circuits, ADD1 an adder, DC a distributing circuit, DAZ, DAY, DAQ DA converters, CPU a computerized control unit, MEM a memory, KB a keyboard, MZ, MY, MQ servomotors for a Z axis, a Y axis or pick-feed axis, and a Q axis or rotational axis, respectively, DRZ, DRY, DRQ driver circuits for driving the Z-, Y- and Q-axis servomotors, respectively, PZ, PY, PQ position detectors, CZ, CY, CQ up/down counters for storing present position, TR a tracer head, ST a stylus, CT a cutter, BLT a belt, WK a workpiece, and MDL a model. The arrangement is such that the tracer head TR and cutter CT are capable of moving in unison along the Z axis and Y axis (the direction orthogonal to the page). It is also arranged so that the model MDL and workpiece W undergo the same rotation via the belt.

The method of te invention will now be described in accordance with FIGS. 2 through 5.

Figures 4A, 4B:
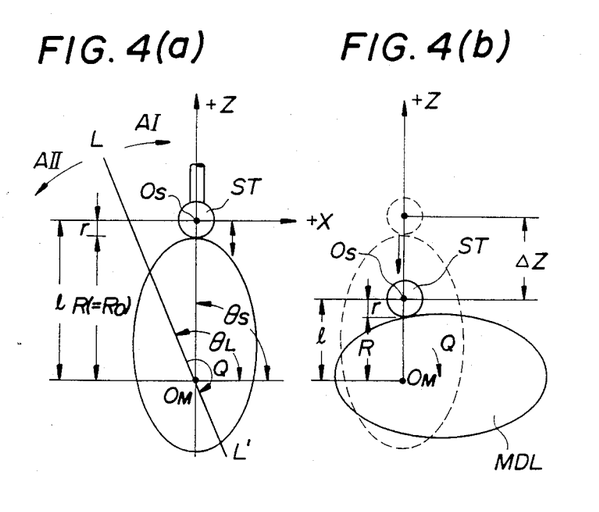
FIGS. 4 and 5 are views for describing processing according to the invention.

First, the keyboard KB is used to enter, and to set in the memory MEM, the radius r of the stylus ST, the distance $R_0$ between lowermost end of the stylus and the rotational center $O_M$ of the model in the initial state [see FIG. 4(A)], and the angle $\theta_L$ specifying the limit line LL'. When the full circumference is divided in half by the limit line LL', the area to which the stylus ST belongs is represented by a first area AI, and the area to which the stylus does not belong is represented by a second area AII.

Under these conditions, the model MDL is rotated to place it in the initial state, after which rotating body tracing is started to bring the stylus ST into contact with the model by an approach operation [see FIG. 4(A)].

When the stylus ST contacts the model and the approach operation ends, an angle $\theta_S$ indicating the rotational position of the stylus in the initial state and the angle $\theta_L$ indicating the angular position of the limit line LL' are used to compute $(\theta_S - \theta_L)$, and the sign (positive or negative) of this value is obtained (see step 100).

Next, if the sign is negative, the sign of $(\theta_S - \theta_L + 180)$ is stored as S (step 103); if the sign is positive, the sign of $(\theta_S - \theta_L + 180)$ is stored as S (step 104). If the sign S is positive, the stylus ST is initially in an area clockwise of the limit line LL', and this area is the first area AI; if the sign S is negative, the stylus ST is initially in an area counter-clockwise of the limit line LL', and this area is the second area AII.

Next, the control unit CPU performs the operation $0 \to C$ (step 106) and tracing of the rotating body is executed from this time onward (step 108). Tracing of the rotating body is performed in the following manner:

The tracer head TR (FIG. 2) outputs displacement signals $\epsilon_x$, $\epsilon_y$, $\epsilon_z$ conforming to three-dimensional displacement of the stylus ST which moves while in contact with the model MDL. The displacement synthesizing circuit DG forms a resultant displacement signal $$\epsilon = \sqrt{\epsilon_x^2 + \epsilon_y^2 + \epsilon_z^2}$$

from the displacement signals $\epsilon_x$, $\epsilon_y$, $\epsilon_z$ and applies the signal to the adder ADD1. The latter obtains the difference between the resultant displacement signal $\epsilon$ and a reference displacement signal $\epsilon_0$ and applies the difference to the velocity computing circuits ARN, ART, which obtain a normal-direction velocity signal $V_N$ and a tangential-direction velocity signal $V_T$ and apply these signals to the distributing circuit DC.

The changeover circuit CC applies the displacement signals $\epsilon_x$, $\epsilon_z$ to the indexing circuit IND, which forms displacement direction signals $\sin \alpha$, $\cos \alpha$ based on the displacement signals $\epsilon_x$, $\epsilon_z$ and applies these signals to the distributing circuit DC. The distributing circuit DC forms X- and Z-axis command velocity signals from the displacement direction signals $\sin \alpha$, $\cos \alpha$ the normal-direction velocity signal $V_N$ and the tangential-direction velocity signal $V_T$. The foregoing is exactly the same as surface tracing control in a Cartesian coordinate system and is well known.

The control unit CPU reads the present position $Z_a$ along the Z axis from the present position counter CZ every predetermined sampling time $\Delta T$ and performs the operation $$Z_a - Z_i \to \Delta Z_i$$

thereby obtaining a Z-axis travelling distance $\Delta Z_i$ during one sampling time $\Delta T$ (where $Z_i$ represents the present position at a time $\Delta T$ earlier). The control unit CPU also performs the operation $$\Delta Z + \Delta Z_i \to \Delta Z$$

thereby computing the Z-axis amount of displacement $\Delta Z$ of the stylus center $O_S$ at the initial position [see the dashed line in FIG. 4(B)] and present position [see the solid line in FIG. 4(B)].

Next, the control unit CPU performs the operation indicating by the following expression:

$$R_0 + r + \Delta Z \to l$$

thereby computing the distance l between the center $O_S$ of the stylus ST and the rotational center $O_M$ of the model.

Thereafter, the control unit CPU reads the X-axis velocity $V_x$ from the distributing circuit DC and, using the distance l and velocity component $V_x$ obtained above, computes and outputs a rotational velocity W of the model, which conforms to the horizontal velocity $V_x$, in accordance with the following expression:

$$V_x/l \to W$$

The DA converters DAZ, DAQ convert the Z-axis velocity component $V_z$ and the angular velocity W into analog velocity command voltages and input these voltages to the corresponding servomotors MZ, MQ to rotate the same. As a result, the model MDL rotates and the stylus ST moves in the Z direction. The workpiece WK rotates in unison with the model and the cutter CT moves in unison with the stylus so that the workpiece is machined in accordance with the shape of the model.

The foregoing relates to rotating body tracing control which does not include pick-feed control. In actuality, however, pick-feed control from step 110 onward shown in FIG. 3 is executed in parallel with this tracing control. In order to facilitate an understanding of the invention, a case will now be described in which the model MDL is at rest and the stylus SL is rotated relative to the model.

Figure 5A:
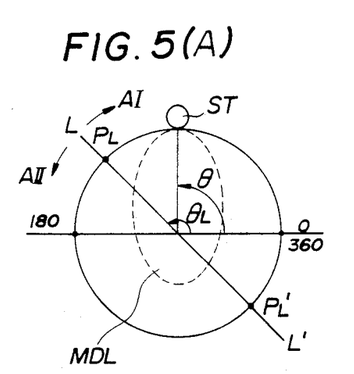
Figure 5B:
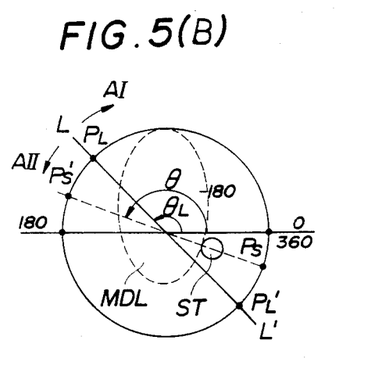
Figure 5C:
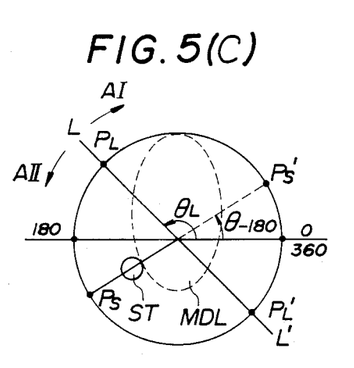
Figure 5D:
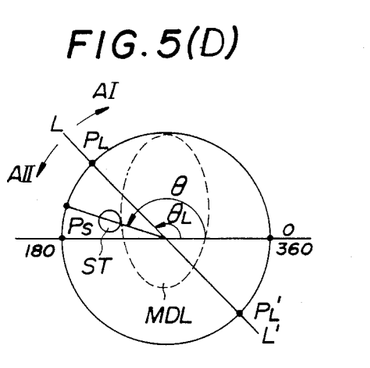

When tracing of the rotating body starts at step 108 following completion of the approach, the control unit CPU reads the rotational position $\theta$ of the stylus from the present position counter CQ at the predetermined time interval to compute $(\theta - \theta_L)$, and discriminates the sign thereof (step 110). If the sign is negative, the sign of $(\theta - \theta_L + 180)$ is made S' (step 112); if the sign is positive, $(\theta - \theta_L - 180)$ is made S' (step 114). The stylus ST is present in the first area AI if the sign S' is positive and in the second area AII if the sign S' is negative. By way of example, (i) when $0 \leq \theta < \theta_L$ holds [see FIG. 5(A)], $(\theta - \theta_L)$ is negative, so that the computation $(\theta - \theta_L + 180)$ is performed, the sign whereof is positive (S' = positive);

(ii) when $(\theta_L + 180) \leq \theta \leq 360$ holds [see FIG. 5(B)], $(\theta - \theta_L)$ is positive, so that the computation $(\theta - \theta_L - 180)$ is performed, the sign whereof is positive (S' = positive);

(iii) when $180 \leq \theta < (\theta_L + 180)$ holds [see FIG. 5(C)], $(\theta - \theta_L)$ is positive, so that the computation $(\theta - \theta_L - 180)$ is performed, the sign whereof is negative (S' = negative); and (iv) when $\theta_L \leq \theta < 180$ holds [see FIG. 5(D)], $(\theta - \theta_L)$ is positive, so that the computation $(\theta - \theta_L 180)$ is performed, the sign whereof is negative (S' = negative).

Next, the control unit CPU checks to see whether $S \neq S'$ holds (step 116). If the answer is NO (i.e., if $S = S'$ holds), this means that the stylus ST has not yet penetrated the other area and, hence, processing is repeated from step 108 onward.

If the answer is YES (i.e., if $S \neq S'$ holds) at the decision of step 116, however, this means that the stylus has penetrated the other area. As a result, the counted value C is incremented and the operation $S' \rightarrow S$ is performed. It should be noted that the counted value C (initially 0) is incremented in the manner $$0 \rightarrow 1 \rightarrow 2 \rightarrow 1 \rightarrow 2 \rightarrow 1 \rightarrow 2$$

each time an incrementing signal is generated. Accordingly, the counted value C changes from 1 to 2 whenever the stylus ST crosses the limit line LL' twice, or in other words, whenever the stylus penetrates the area in which it was present initially.

Thereafter, the control unit CPU checks to see whether C = 2 holds (step 120). If C = 2 does not hold, processing is executed from step 108 onward; if C = 2 does hold, a predetermined amount of pick-feed is performed along the Y axis (in a direction parallel to the rotational axis of the model) and processing is repeated from step 108 onward until rotating body tracing ends.

In the case described above, pick-feed is performed when the stylus penetrates the first area, which is the area in which it is initially present. However, it can be arranged so that the pick-feed is performed when the stylus penetrates the second area.

In accordance with the present invention, it is arranged to form two areas (first and second areas) by dividing the full circumference of a model by a straight line connecting a position having a predetermined rotational angle and the center of rotation of the model, determine in which area the stylus is present when the stylus rotates relative to the model owing to rotating body tracer control, refrains from executing a pick-feed when the stylus enters the second area from the first area, and executes a pick-feed when the stylus enters the first area from the second area. This makes it possible to perform a pick-feed reliably every revolution with just one limit line (i.e., by setting just one angle $\theta_L$).

I claim:

1. A pick-feed method in rotating body tracing for performing tracer control by rotating a model, advancing or retracting a stylus in contact with the model, in dependence upon the shape of the model, in a direction of the center of rotation, and pick-feeding the stylus in a plane parallel to a rotational axis of the model every revolution of the model, the method characterized by:

forming first and second areas by dividing the full circumference of the model in half by a limit line connecting a position having a predetermined rotational angle $\theta_L$ and said center of rotation;

determining in which area said stylus is present when said stylus is rotated relative to the model by rotating body tracer control;

refraining from executing a pick-feed when the stylus enters the second area from the first area, and executing a pick-feed when the stylus enters the first area from the second area.

2. A pick-feed method in rotating body tracing according to claim 1, characterized by determining in which area said stylus is present when rotating body tracing starts, and adopting an area in which said stylus is initially present as the first area.

3. A pick-fed method in rotating body tracing according to claim 2, characterized in that when an angle indicating a rotational angle of the stylus in an initial state is $\theta_S$ and a rotational position of said limit line is $\theta_L$, the sign of $(\theta_S - \theta_L + 180)$ is stored as S if the sign of $(\theta_S - \theta_L)$ is negative, the sign of $(\theta_S - \theta_L - 180)$ is stored as S if the sign of $(\theta_S - \theta_L)$ is positive, the sign of S is adopted as the sign of the first area, and the sign which is the opposite of the sign of S is adopted as the sign of the second area.

4. A pick-feed method in rotating body tracing according to claim 3, characterized in that when an angle indicating a rotational angle of the stylus at the present time is $\theta$, the sign of $(\theta - \theta_L + 180)$ is stored as S' if the sign of $(\theta - \theta_L)$ is negative, the sign of $(\theta - \theta_L - 180)$ is stored as S' if the sign of $(\theta - \theta_L)$ is positive, and a pick-feed is performed when the sign of S' agrees with the sign of S.

5. A pick-feed method in rotating body tracing according to claim 3, characterized in that when an angle indicating a rotational angle of the stylus at the present time is $\theta$, the sign of $(\theta - \theta_L + 180)$ is stored as S' if the sign of $(\theta - \theta_L)$ is negative, the sign of $(\theta - \theta_L - 180)$ is stored as S' if the sign of $(\theta - \theta_L)$ is positive, and a pick-feed is performed when the sign of S' no longer agrees with the sign of S.

* * * * *

UNITED STATES PATENT AND TRADEMARK OFFICE
CERTIFICATE OF CORRECTION

PATENT NO. : 4,870,337
DATED : September 26, 1989
INVENTOR(S) : Hitoshi Matsuura It is certified that error appears in the above-identified patent and that said Letters Patent is hereby corrected as shown below:

Col. 3, line 34, change "te" to --the--;

line 59, NO NEW PARAGRAPH, and change "$(\theta_s-\theta_L+180)$" to --$(\theta_s-\theta_L-180)$--.

Col. 4, line 51, change "1" to --$\ell$--;

line 53, change "1" to --$\ell$--;

line 58, change "1" to --$\ell$--;

line 63, change "1" to --$\ell$--.

UNITED STATES PATENT AND TRADEMARK OFFICE
CERTIFICATE OF CORRECTION

PATENT NO. : 4,870,337

DATED : September 26, 1989

INVENTOR(S) : Hitoshi Matsuura

It is certified that error appears in the above-identified patent and that said Letters Patent is hereby corrected as shown below:

Col. 5, line 37, change "$(\theta-\theta_L 180)$"

to -- $(\theta-\theta_L-180)$ --.

Signed and Sealed this

Fourteenth Day of August, 1990

Attest:

HARRY F. MANBECK, JR.

Attesting Officer      Commissioner of Patents and Trademarks